J. HESS.
ELECTRIC FURNACE.
APPLICATION FILED NOV. 20, 1911.
1,073,684.
Patented Sept. 23, 1913.
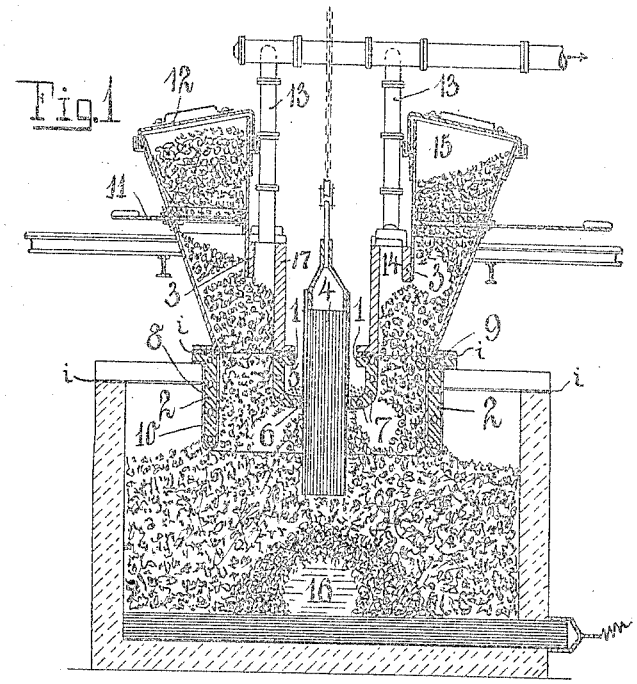
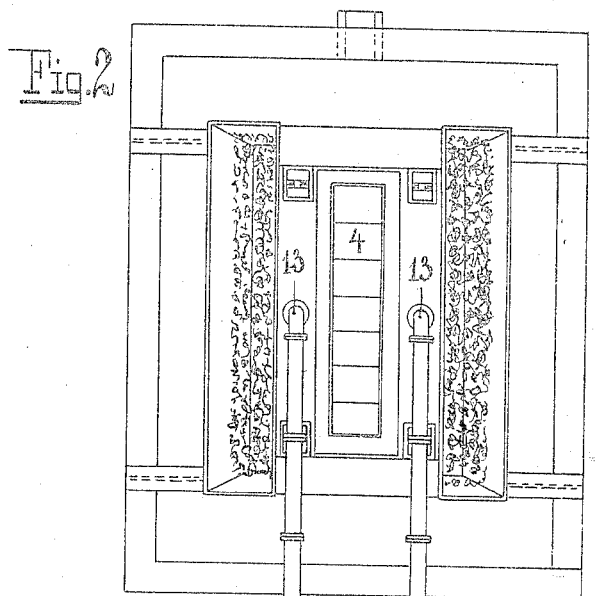
Witnesses
Inventor
Johannes Hess

UNITED STATES PATENT OFFICE.

JOHANNES HESS, OF VIENNA, AUSTRIA-HUNGARY, ASSIGNOR TO THE FIRM OF BOSNISCHE ELECTRICITATS-ACTIENGESELLSCHAFT, OF VIENNA, AUSTRIA-HUNGARY.

ELECTRIC FURNACE.

1,073,684.  Specification of Letters Patent.  Patented Sept. 23, 1913.

Application filed November 20, 1911. Serial No. 661,345.

*To all whom it may concern:*

Be it known that I, JOHANNES HESS, engineer, citizen of Switzerland, residing at Vienna, in the Empire of Austria-Hungary, have invented new and useful Improvements in Electric Furnaces, of which the following is a specification.

The present invention relates to an electric furnace with vertical electrodes, which is mainly intended for such processes, during the carrying out of which considerable quantities of gas escape.

The object of the present invention is to unite the gas delivery and the charge supply in one chamber immediately around the electrode or the electrodes without the reduction or fusion zone being disadvantageously extended. In order to obtain this object, the vertical electrodes are surrounded by a charging shaft, which surrounds unipolar electrodes only.

According to the present invention the arrangement is such, that the walls of the charging shaft which are insulated from the walls of the furnace surround a part of the furnace area only, corresponding to the area of the fusion zone to be produced and touch the top of the charge in the fusion and reaction zone proper or dip into the same. In the charging shaft furthermore an inside hopper may be provided by which the charge introduced into the shaft is held out of contact with the upper part of the electrodes. The space between the electrodes and inside hopper can be closed in a sufficiently gas tight manner by powdered charge being heaped upon their joint. The thus created outer chamber of the charging shaft is preferably lengthened above and this lengthened part is divided by a partition in its upper portion into two chambers of which the one serves for the supply of the charge, the other for the escape of the gases. The charging shaft may be made of iron, which is lined on the inside with a refractory material and is cooled by water.

The accompanying drawing exemplifies a constructional form of the present invention.

Figure 1 is a vertical section through the furnace; Fig. 2 is a plan of the furnace.

The charging shaft corresponding in its sectional area to that of the fusion and reaction hearth 16 and touching or extending in the top of the charge within the furnace consists of an inner wall 1 and an outer wall 2. The inner wall which surrounds the electrodes 4 has a hopper directly on their port side not for the purpose of supplying the charge between the walls and their electrodes but for holding the charge sinking down into the charging shaft apart from the electrodes. The lower ends of the approximately vertical wall of this inside hopper 1 may be provided with an approximately horizontal flange projecting toward the electrodes and extending close to their surfaces. This inner wall or hopper 1 is preferably cooled by water which flows through the interior of the wall. The space between the vertical electrodes 4 and the inner wall or hopper 1 is closed gas tight by powdered charge 5 being heaped at the joint 6. The inner wall 1 of the charging shaft is lengthened at its upper end by an extension 17 and this extension is connected with the gas discharge and the charge supplying means but is otherwise closed gas tight. By such arrangement it is possible to discharge almost the entire volume of gas through the charging shaft. The inner wall or hopper 1 is electrically insulated by intermediate layers 3 and 7 from the outer wall 2 of the charging shaft and preferably also from the electrodes 4. The walls of the charging shaft consist of iron plates 8, which are preferably provided with a water cooling arrangement 9, whereby the construction will be greatly facilitated. For improving the heat-economy the cooled iron plates 8 are lined with a refractory material 10. The charge is supplied by the usual means, in the drawing a double closure (slide 11 and lid 12) is indicated, which will allow of closing the gas chamber in a sufficient manner during the charging operation. The gas discharge is effected through the pipes 13 provided laterally in the upper part of the extension of the charging shaft. This lateral gas discharge, which reduces the amount of dust carried along with the gas, is facilitated by the provision of the partition 3; this partition divides the extension of the charging shaft in its upper part into two chambers 14 and 15, of which the inner chamber 14 serves for the gas discharge and the outer chamber 15 for the charge supply.

The dimensions of the shaft depend on the respective size of and load on the furnace. They may be varied within wide limits, if only the principle is observed, that the horizontal sectional area of the shaft is considerably smaller than the sectional area of the furnace.

In place of the closure and discharge arrangements shown in the exemplified constructional form, also other arrangements, for instance those customary with gas producers may be employed. The furnace can be used both for single and multiple phase current and for continuous current furnaces with single electrodes or such connected in series. When multiple phase currents are used each electrode of a different denomination must be provided with a separate hopper.

By the hereinbefore described arrangement the heat of the hot gases rising on their natural path along the electrodes is utilized with advantage for heating the sinking colder charge, an undesirable extension of the reaction zone being nevertheless avoided. The difficulties hitherto met with for the discharge of the gases in counter current with the material, namely the fusion zone was extended and the resistance of the furnace would sink, whereby, while the load remained constant, the electrode had to be continuously raised, are obviated by the construction of the furnace according to the present invention, as the reduction of the sectional area of the shaft will effect a concentration of the lines of current radiating from the electrode, toward the fusion zone. The combination which forms the essential feature of the present invention renders the pre-heating of the charge desirable for heat-economy reasons by means of the rising gases possible in practice.

Having now described my invention what I claim and desire to secure by Letters Patent of the United States is:

1. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace.

2. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace and corresponding to that of the re-action hearth to be produced.

3. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace, the said shaft having walls insulated from the walls of the furnace.

4. In an electric furnace with vertical unipolar electrodes, a charging shaft surrounding said electrodes and having an outward extension, gas discharge means connected to the upper part of said shaft extension, the lower end of said shaft extending in the top of the charge in the fusion and reaction zone proper and having a sectional area smaller than that of the furnace.

5. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace, and an inside hopper within said shaft adapted to hold the charge and gas apart from the upper part of the electrode.

6. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace, an inside hopper within said shaft extension adapted to hold the charge and gas apart from the upper part of the electrode, the space between the said electrode and the said inside hopper being closed by powdered charge heaped upon their joint.

7. In an electric furnace with vertical unipolar electrodes, a charging shaft surrounding said electrodes and having an outward extension, the said shaft touching the top of the charge, and having a sectional area smaller than that of the furnace, an inside hopper within said shaft adapted to hold the charge apart from the upper part of the electrode, the space between the inside hopper and the outer wall of the shaft being divided by a partition in its upper portion into two chambers to form a supply for the charge, and an escape for the gases.

8. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace, the said lower end of the shaft being composed of iron plates lined with a refractory material.

9. In an electric furnace with vertical unipolar electrodes, a charging shaft surrounding said electrodes and having an outward extension, gas discharge means connected to the upper part of said shaft extension, the lower end of said shaft touching the top of the charge in the fusion and reaction zone proper and having a sectional area smaller than that of the furnace, the said lower end of the shaft being composed of iron plates lined with a refractory material and cooled with water.

In testimony whereof I have hereunto set my hand in presence of two subscribing witnesses.

JOHANNES HESS.

Witnesses:
 AUGUST FUGGER,
 ADA MARIA BERGER.